US008570955B2

(12) United States Patent
Viorel et al.

(10) Patent No.: US 8,570,955 B2
(45) Date of Patent: Oct. 29, 2013

(54) METHOD OF GROUPING AND MAPPING TRANSMISSION STATIONS IN A WIRELESS NETWORK

(75) Inventors: Dorin Viorel, Calgary (CA); Wei-Peng Chen, Santa Clara, CA (US); Jonathan Agre, Brinklow, MD (US); Chenxi Zhu, Gaithersburg, MD (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/036,475

(22) Filed: Feb. 25, 2008

(65) Prior Publication Data

US 2008/0219365 A1 Sep. 11, 2008

Related U.S. Application Data

(60) Provisional application No. 60/893,702, filed on Mar. 8, 2007.

(51) Int. Cl.
H04W 4/00 (2009.01)

(52) U.S. Cl.
USPC ............ 370/329; 375/329; 375/475; 455/450

(58) Field of Classification Search
USPC ........... 370/328, 329, 338; 375/260; 455/115, 455/426
See application file for complete search history.

(56) References Cited

U.S. PATENT DOCUMENTS

| 2002/0114286 A1* | 8/2002 | Iwamura et al. | 370/252 |
| 2003/0166408 A1* | 9/2003 | Zhang et al. | 455/522 |
| 2004/0081074 A1* | 4/2004 | Piechocki | 370/206 |
| 2002/0215251 | 9/2005 | Krishnan et al. | |
| 2006/0035643 A1* | 2/2006 | Vook et al. | 455/450 |
| 2006/0050702 A1* | 3/2006 | Matsui et al. | 370/392 |
| 2007/0171808 A1* | 7/2007 | Wu et al. | 370/208 |
| 2007/0230373 A1* | 10/2007 | Li et al. | 370/267 |

FOREIGN PATENT DOCUMENTS

EP  1 582 042 A2  10/2005

OTHER PUBLICATIONS

"Uplink Reference Signal for E-UTRA", 3GPP TSG RAN WG1 Meeting #47, Riga, Latvia, Nov. 6-19, 2006.
Office Action issued by the Japanese Patent Office on Apr. 4, 2012 in the related Japanese patent application No. 2008-057035.
"Uplink Reference Signal for E-UTRA", 3GPP TSG RAN WG1 Meeting #47, Riga, Latvia, Nov. 6-10, 2006.
Partial English language translation of Office Action issued by the Japanese Patent Office on Apr. 4, 2012 in the related Japanese patent application No. 2008-057035.

(Continued)

Primary Examiner — David Oveissi
(74) Attorney, Agent, or Firm — Staas & Halsey LLP

(57) ABSTRACT

A method of mapping transmission stations in a wireless network by grouping the transmission stations such that each transmission station in the same group transmits a sounding signal in the same time symbol. A method of grouping transmission stations in a wireless network includes sorting the transmission stations in descending order according to a number of transmission links of each transmission station that are unmapped, evaluating each transmission station based on how many unmapped transmission links can be mapped if the evaluated transmission station is made to transmit a sounding signal, placing each transmission station into a group, based on the evaluation, until all of the transmission links are mapped or until the maximum number of sounding bands are used, and, if all of the transmission links are not mapped, repeating the sorting, evaluating, and placing for each time symbol until all of the transmission links are mapped.

19 Claims, 4 Drawing Sheets

(56) References Cited

OTHER PUBLICATIONS

European Search Report issued Jun. 21, 2013 in European Application No. 08102266.7.

Chen, Wei-Peng, et al, "Interference Detection and Measurement in OFDMA Relay Networks", IEEE 802.16 Broadband Wireless Access Working Group, Mar. 5, 2007, pp. 1-12.

"Part 16: Air Interface for Fixed and Mobile Broadband Wireless Access Systems, Amendment for Physical and Medium Access Control Layers for Combined Fixed and Mobile Operation in Licensed Bands", IEEE Standard for Local and Metropolitan Area Networks, Jan. 8, 2006, 818 pages.

* cited by examiner

METHOD OF GROUPING AND MAPPING TRANSMISSION STATIONS IN A WIRELESS NETWORK

CROSS-REFERENCE TO RELATED APPLICATIONS

The present application claims priority to provisional application titled "A GROUPING ALGORITHM TO RS/BS IN MULTIHOP RELAY NETWORKS", Ser. No. 60/893,702, filed Mar. 8, 2007, inventors Chenxi Zhu, Wei-Peng Chen, Dorin Viorel, and Jonathan Agre, and which is incorporated herein by reference.

BACKGROUND OF THE INVENTION

Description of the Related Art

Wireless communication networks have become increasingly popular and generally include a base station that provides service to a cell area located around the base station. Mobile stations (such as cell phones, etc.) are able to communicate with the base station when they are within the service area of the base station. In certain types of wireless communication networks, such as, for example, those based on the Institute of Electrical and Electronics Engineers (IEEE) 802.16 standard, "last mile" connectivity of mobile stations within the network is the focus.

However, in wireless communication networks, due to such effects as shadowing arising from blockage by buildings and other obstructions between transmission/reception antennas, there exist dead zones in which communication with the base station is not possible, despite being within the service area. To combat this problem, in an Orthogonal Frequency Division Multiple Access (OFDMA) network, relay stations are employed for providing enhanced transmission capabilities by acting as intermediaries between mobile stations operating in the network and the base station. In this manner, a mobile station that is incapable of connecting directly to a base station within its cell service area may still connect indirectly to the base station by first communicating with a relay station that does have a direct link, or possibly an indirect link, to the base station.

SUMMARY OF THE INVENTION

Various embodiments of the present invention provide a method of mapping transmission stations in a wireless multi-hop network by grouping the transmission stations such that each transmission station in the same group transmits a sounding signal in the same time symbol.

Various embodiments of the present invention provide a method of mapping transmission stations in a wireless multi-hop network which includes (a) inputting, into an algorithm, a number of transmission stations to be mapped; (b) inputting, into the algorithm, a maximum number of sounding bands available in a single sounding slot for sounding signals to be sent by the transmission stations; (c) calculating the total number of sounding slots required to map all of the links between the transmission stations; and (d) grouping the transmission stations by sounding slot. Furthermore, each transmission station in the same group transmits a sounding signal in the same sounding slot.

Various embodiments of the present invention provide a method of grouping transmission stations in a wireless multi-hop network which includes (a) sorting the transmission stations in descending order according to a number of transmission links of each transmission station that are unmapped; (b) beginning with the transmission station with the largest number of unmapped transmission links, evaluating each transmission station based on how many unmapped transmission links can be mapped if the evaluated transmission station is made to transmit a sounding signal; (c) placing each transmission station into a group, based on the evaluation, until all of the transmission links are mapped or until a maximum number of sounding bands available for transmission of sounding signals in the same time symbol are used; and (d) if all of the transmission links are not mapped, repeating the sorting, evaluating, and placing for each time symbol until all of the transmission links are mapped.

The above embodiments of the present invention are simply examples, and all embodiments of the present invention are not limited to these examples. Embodiments of the present invention are not limited to wireless multi-hop networks, but can also include single hop networks.

Additional aspects of the invention will be set forth in part in the description which follows, and, in part, will be obvious from the description, or may be learned by practice of the invention.

DETAILED DESCRIPTION OF THE PREFERRED EMBODIMENTS

Figure 1:
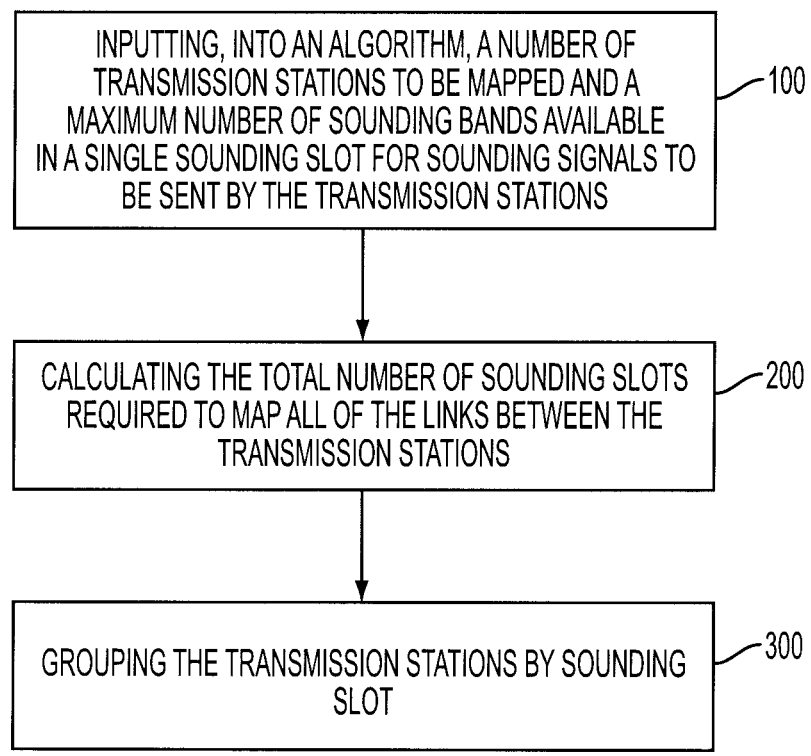
FIG. 1 is a flowchart illustrating a method of mapping transmission stations in a wireless multi-hop network, according to an embodiment of the present invention.

Reference will now be made in detail to the present preferred embodiments of the present invention, examples of which are illustrated in the accompanying drawings, wherein like reference numerals refer to like elements throughout.

In a multi-hop relay network, for example a network under the Institute of Electrical and Electronics Engineers (IEEE) 802.16j or 802.16m standard, the interference is more severe than in a regular cellular network due to the large number of relay stations. If only one relay station sends a sounding signal and the others conduct the measurement in each of the sounding slots, the number of sounding slots required to map the network will be the same as the number of relay stations. Since the overhead increases with the network size linearly, this creates a severe limit on the scalability of the sounding scheme.

Various embodiments of the present invention provide a method of mapping transmission stations in a wireless multi-hop network. In order to estimate channel link quality among the many relay stations and one or more base stations within a network, mapping must be carried out. This mapping allows the network to select the optimal route for signal transmission among the entities within the network (such as base stations, relay stations, and/or mobile stations). Uplink sounding has been proposed as an effective method to estimate the channel gain and interference strength between multiple relay stations and base stations. Because a relay station cannot transmit and receive in the channel at the same time, scheduling is required to dictate which relay stations transmit in which sounding slot and sounding band, while other relay stations and base stations will receive the sounding signal and conduct measurement. The length of the schedule determines the overhead of the uplink sounding mechanism.

This mapping procedure includes a process of uplink sounding, whereby a target relay station sends a sounding signal, in a known time slot and at a known frequency, to a base station or another relay station that is not transmitting a sounding signal during that same time, which can measure the quality of the signal for that particular transmission link. It is more efficient to have multiple relay stations within the network send their sounding signals at the same time. However, these relay stations typically cannot send sounding signals and receive sounding signals at the same time, such that links between the various relay stations cannot be mapped.

By grouping the transmission stations, such as relay stations, such that each transmission station in the same group transmits a sounding signal in the same time symbol, the entire network can be mapped in a minimum amount of time while requiring the least amount of overhead. As such, the total number of sounding slots is reduced due to the large number of relay station transmission links that can be mapped in each time symbol. Each time symbol is used for transmitting sound signals and represents the smallest time slot available in the network, based on the standards of the given network. If a station is not able to transmit a sounding signal, for example a base station in an 802.16j network, that station will receive a sounding signal from the other network stations at all times and will be considered to be fully mapped when all the stations that are able to transmit the sounding signal have sent their sounding signals. Such a station is considered when the groups (transmission schedule) are produced. A channel between two stations that cannot transmit a sounding signal must be measured using other means.

Each of these time symbols includes a number of different sounding bands, such that multiple sounding signals can be transmitted by a number of different relay stations in the same time symbol, with each sounding signal from a different relay station being sent over a different sounding band. Those relay stations that do not transmit sounding signals in a particular time symbol are able to receive and measure the signals sent by the relay stations that are transmitting the sounding signals. In this manner, the minimum amount of time symbols is required for mapping the maximum amount of transmission links in the network.

The number of sounding bands in a given time symbol may be, for example, 8 or 10 sounding bands, as is usually provided for a network under the Institute of Electrical and Electronics Engineers (IEEE) 802.16 standard. However, the present invention is not limited to any particular number of sounding bands per time symbol.

FIG. 1 is a flowchart illustrating a process of mapping transmission stations in a wireless multi-hop network, according to various embodiments of the present invention. Referring to FIG. 1, in operation 100, a number of transmission stations to be mapped and a maximum number of sounding bands available in a single sounding slot for sounding signals to be sent by the transmission stations are input into an algorithm. Next, in operation 200, the algorithm calculates the total number of sounding slots required to map all of the links between the transmission stations based on the input values.

Finally, in operation 300, the algorithm groups the transmission stations by sounding slot such that each transmission station in the same group transmits a sounding signal in the same sounding slot. Furthermore, if some transmission stations do not need to be mapped, this can be taken into consideration and the set of sounding groups may be reduced, thereby further reducing the overhead. An algorithm for carrying out the method of mapping illustrated in FIG. 1 is described in more detail below. However, the method illustrated in FIG. 1 is not limited to the use of any particular algorithm.

Figure 2:
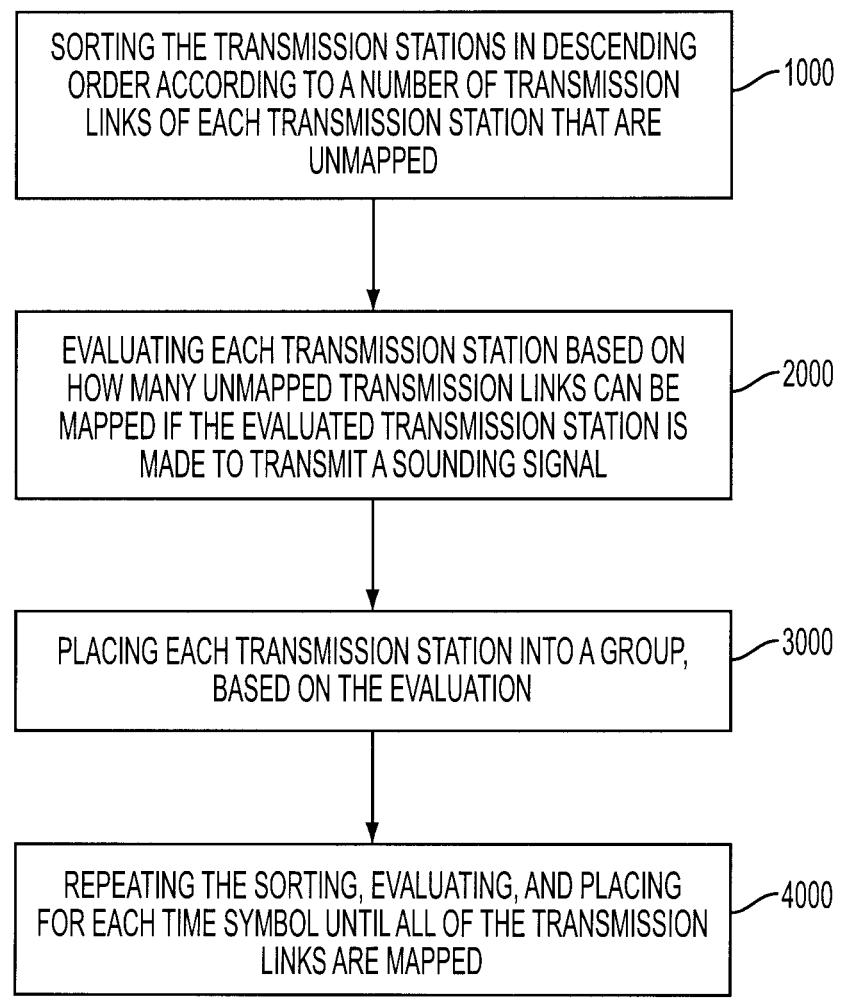
FIG. 2 is a flowchart illustrating a method of grouping transmission stations in a wireless multi-hop network, according to an embodiment of the present invention.

FIG. 2 is a flowchart further illustrating a process of grouping transmission stations, such as in operation 300 in the embodiment described above, in a wireless multi-hop network, according to various embodiments of the present invention. Referring to FIG. 2, in operation 1000, the transmission stations are sorted in descending order according to a number of transmission links of each transmission station that are unmapped. Next, in operation 2000, each transmission station is evaluated, beginning with the transmission station with the largest number of unmapped transmission links, based on how many unmapped transmission links can be mapped if the evaluated transmission station is made to transmit a sounding signal. The evaluation includes determining how many unmapped transmission links can be mapped if the evaluated transmission station is made to transmit a sounding signal. For each transmission station, if more transmission links can be mapped by letting the transmission station transmit a sounding signal, then the transmission station is added to the current transmitting group. If not, then the transmission station continues only to receive signals.

The evaluating may include a balancing between whether a transmission station being evaluated would be better suited to be placed into a particular transmitting group or left to receive sounding signals only. For example, if the transmission station being evaluated can receive sounding signals form other transmission stations that have already been placed in the transmitting group, then that particular transmission station may be better suited for mapping those respective transmission links based on received signals, and, therefore, does not need to be placed in the current transmitting group. Furthermore, if some transmission stations do not need to be mapped, this can be taken into consideration and the set of sounding groups may be reduced, thereby further reducing the overhead.

From there the process moves to operation 3000, where each transmission station is placed into a group, based on the evaluation. The transmission stations continue to be placed into these groups until all of the transmission links are mapped or until a maximum number of sounding bands available for transmission of sounding signals in the same time symbol are used. Finally, in operation 4000, if all of the transmission links are not mapped, the sorting, evaluating, and placing is repeated for each time symbol until all of the transmission links are mapped.

Various embodiments of the present invention may be executed by an algorithm, as was described above in reference to FIGS. 1-2. Presented below is an example execution of an algorithm according to an embodiment of the present invention, wherein the algorithm has been carried out by a computer software program MATLAB.

```
% RS interference mapping algorithm
% Each round, choose the TX_RS one by one
% For each RS, if more links can be mapped by letting it TX UL sounding,
% add it to the T_RS set; Otherwise leave in R_RS set
% Input variables:
% N: size of networks to be mapped
% Num_sounding_band: number of sounding bands in each sounding slot.
% Notion:
% Udir_edge(i, j): mapping status of undirected edge between RS i and RS_j
% t1_edge(i, j): tentative link mapping matrix at the current iteration.
% −1: i=j
% 0: (i, j) have not been mapped
% 1: (i, j) have been mapped in previous iteration
% 2: (i, j) are tentatively to be mapped in the next iteration.
clear;
debug = 0; % debug mode
Max_Num_RS = 64;
% Input parameters:
N=10; % number of RS needs to be mapping
Num_sounding_band = 43;
% Number of sounding bands: maximal number of RSs that can send sounding 9
% signal at the same time
All_RS = [1:N];
TT= [ ];
Max_Sounding=min(ceil (N/2), Num_sounding_band) ;
Udir_edge = −1*eye(N);
%%%%%%%%%%%%%%%%t%%%%%%%%%% Note %%%%%%%%%%%%%%%%%%%%%%%%%%%%
% If for some reason that there is no need to map the channel between RS_i
% and RS_j, in the initialization phase, Udir_edge (i, j) and Udir_edge (j, i)
% can be set to 1. This way this link will not be considered by the
% sounding algorithm.
%%%%%%%%%%%%%%%%%%%%%%%%%%%%%%%%%%%%%%%%%%%%%%%%%%%%%%%%%%%%
for k = 1:N
        L1=sum(Udir_edge == 0);
        [num_link_unmapped, RS_order] = sort (L1,'descend');
        if (sum(num_link_unmapped) == 0)
                break;
        end;
        t1_edge = Udir_edge;
        T_RS = [ ];
        R_RS = all_RS;
        for ii = 1:N
                tt=RS_order(ii); R_RS_p=func_set_remove
                (R_RS, [tt]);
                link_to_map=0;
                link_demap=0;
    for t2 = T_RS
            if (t1_edge (tt, t2) == 2)
                    link_demap = link_demap+1;
            end;
end;
        for r2=R_RS_p
                if (t1_edge(tt, r2) == 0)
                        link_to_map = link_to_map+1;
                end;
        end;
        if (link_to_map > link_demap) % If more links can be mapped by add tt to T_RS
                for t=T_RS % tt and T_RS cannot be mapped. Clear their temp map flag
                        if (t1_edge(t, tt) == 2)
                                t1_edge(t, tt) = 0;
                                t1_edge(tt, t) = 0;
                        end;
                end;
                TR_S = [T_RS tt];
                R_RS = R_RS_p;
                % reconstruct t1_edge matrix
                 for t=TR_S
                        for r=RRS
                                if (t1_edge (t, r) == 0)
                                        t1_edge (t, r) =2;
                                        t1_edge (r, t) =2;
                                end;
                        end;
                end;
        end;
        % Check if the all the sounding bands are used. If no more sound
        % band, wrap up this group
        if (length (T_RS) == Num_sounding_band)
                break;
        end;
```

```
end;
% Summarize this round
for t=T_RS
        for r=R_RS
            Udir_edge (t, r)=1;
            Udir_edge (r, t)=1;
            end;
end;
if (debug)
        fprint f ('Round %d :', k);
        TR_S
        t1_edge
end;
if (length (T_RS) < Max_Sounding)
        T_RS = [T_RS zeros (1, Max_Sounding – length(T_RS))]
end;
TT= [TT; T_RS);
end;
%%
fprintf ('Num_RS: %d, Total rounds: %d\n', N, k−1);
fprintf ('The set of RSs in each sounding slots:');
TT
% Each row of TT is a set of RSs that transmit sounding signal at the same sounding slot.
% The number of rows of TT is the total number of RS sounding slots
% required to map all the links between the RSs.
% Remove an element from an un-ordered set
function (new_set)=func_set_remove(all_element, set_to_remove)
L=length(all_element); M=length(set_to_remove);
New_set = [ ]
for l = 1:L
        t1 = all_element(i);
        if (sum(t1 == set_to_remove) == 0)
           new set = [new set t1];
        end;
end;
```

The above algorithm, performed by MATLAB, is an example of an algorithm for carrying out the method of mapping illustrated in FIG. 1 and the method of grouping transmission stations illustrated in FIG. 2. However, the embodiments of the present invention are not limited to any particular algorithm and are not limited to any particular program, computer or otherwise, for carrying out an algorithm.

The above algorithm, performed by MATLAB, receives as an input a value N, where N is the size of the network to be mapped. In this case, N represents the number of relay stations in the network in this implementation. Mapping between base stations and relay stations is carried out when the relay stations send their sounding signals and they are received by one or more base stations. The algorithm also receives as an input the number of sounding bands available in each time symbol and/or sounding slot. However, the algorithm is not limited only to a WIMAX relay station implementation.

Figure 3:
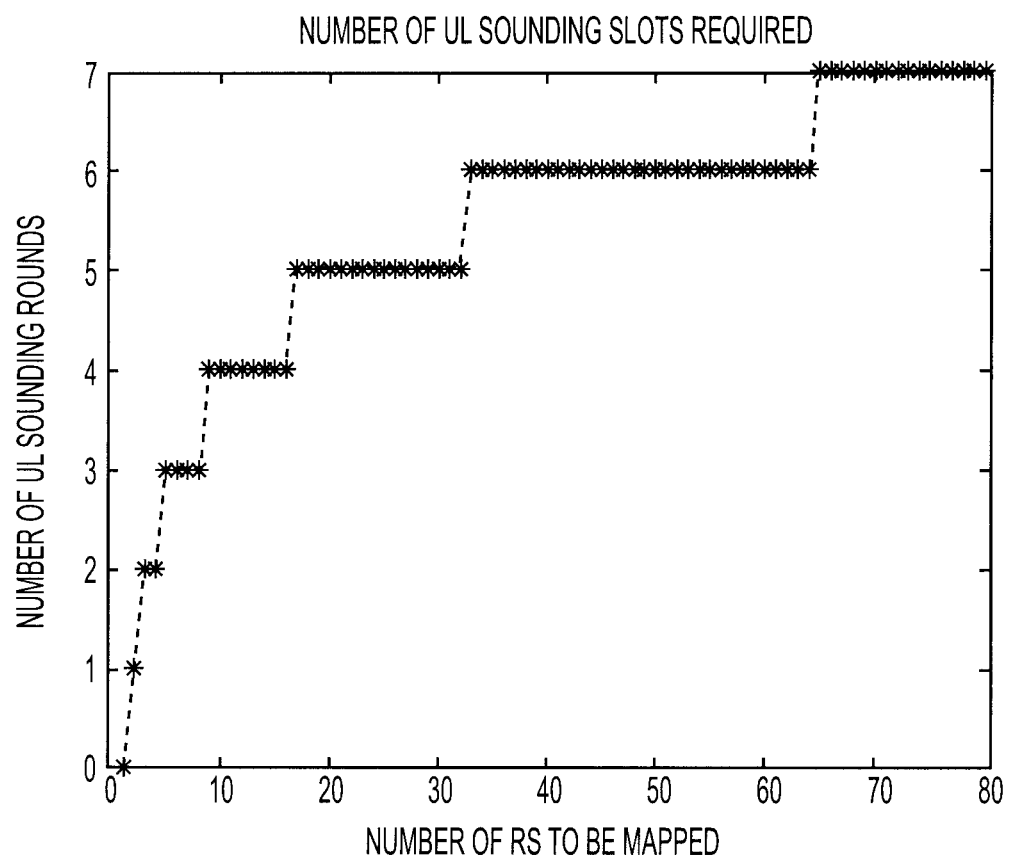
FIG. 3 is a graph illustrating the number of sounding slots required to complete mapping of various sizes of network, according to an embodiment of the present invention.

The algorithm outputs a matrix TT, wherein each row of the matrix is a set of relay stations that transmit a sounding signal in the same sounding slot and the number of rows represents the number of sounding slots that are required to carry out mapping of the entire network. If some of the relay stations do not need to be mapped, the algorithm can take this into account and, therefore, the total number of sounding slots necessary to complete mapping may possibly be reduced. With one group transmitting in the same sounding slot, the whole mapping process between the N stations can be completed in ceil(log 2(N)) sounding slots, where one sounding slot has the length of the number of symbols (minimally 1). This is illustrated by the graph of FIG. 3.

While the above example demonstrates execution of an algorithm according to an embodiment of the present invention, wherein the algorithm has been carried out by a computer software program MATLAB, the present invention is not limited to this example. Furthermore, the present invention is not limited to the algorithm being implemented in a computer program and is not limited to the use of MATLAB for executing the algorithm.

The algorithm may be used to carry out a process of grouping and mapping transmission stations in a wireless multi-hop network according to various embodiments of the present invention. As such, the algorithm may be implemented in a network device, such as a base station or a base station controller, and executed by the device when mapping of the network is required. However, the present invention is not limited to the algorithm being implemented in a device such as a base station or a base station controller, such as an ASN-GW (Access Service Network Gateway). The ASN-GW is the WIMAX network entity which stores the network scheduler SW.

Various embodiments of the present invention provide for an algorithm to be executed in advance and the results of the algorithm to be stored as data in a network device, such as a base station or an ASN-GW. The data includes groupings for the transmission stations that have already been calculated based on different network sizes, up to a maximum possible network size. Therefore, to map a network of a certain size, the algorithm simply refers to the stored value for that particular network size. As a non-limiting example, this result could be the same as the Hadamard code or one of its variations.

As a non-limiting example, the algorithm could be executed and the resultant data could be stored in an ASN-GW as a set of matrices TT(N) for different network sizes (N: 1 to a maximum possible network size). Therefore, to map a network of a certain size M, the ASN-GW would refer to stored matrix TT(M) and use each row of TT(M) as a relay station sounding group. However, the present invention is not limited to the algorithm being implemented in a device such as a base station or a base station controller and storing groupings for the transmission stations that have already been calculated based on different network sizes.

Various embodiments of the present invention provide for an algorithm to be executed in advance and the results of the algorithm to be stored as data in a network device, such as a base station or a base station controller. The data includes groupings for the transmission stations that have already been calculated based on network sizes of $N=2, 4, 8, \ldots 2^k, \ldots 2^M$, where $2^M$ is larger than the maximum possible network. Therefore, for example, to map a network of L nodes, a stored matrix $TT(2^k)$ is used, where k is the smallest integer such that $2^k$ is greater than or equal to L. In this manner, the number of sounding slots required to map a total number of transmission stations L is the value of log 2(L) rounded to the nearest integer greater than or equal to log 2(L). However, the present invention is not limited to the algorithm being implemented in a device such as a base station or a base station controller and storing groupings for the transmission stations that have already been calculated based on network sizes of $N=2, 4, 8, \ldots 2^k, \ldots 2^M$, where $2^M$ is larger than the maximum possible network.

Various embodiments of the present invention provide for an algorithm to be executed in advance and the results of the algorithm to be stored as data in a network device, such as a base station or a base station controller. The data includes groupings for the transmission stations that have already been calculated based on the previous example, with the exception being that N can be any selection of positive integers. However, the present invention is not limited to the algorithm being implemented in a device such as a base station or a base station controller and storing groupings for the transmission stations that have already been calculated based on network sizes of N=any selection of positive integers, where $2^M$ is larger than the maximum possible network.

The algorithm may be carried out by, for example, a computer software program such as MATLAB. However, the present invention is not limited to an algorithm or any particular computer program for carrying out an algorithm.

Figure 4:
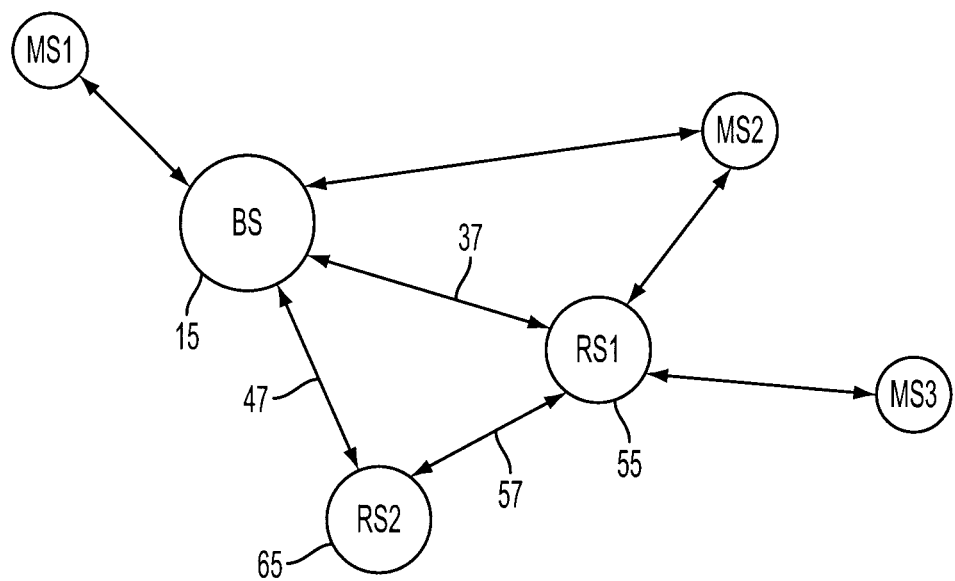
FIG. 4 is an illustration of an example of an inter-cell topology involving two relay stations operating in an OFDMA network under the 802.16 standard.

Various embodiments of the present invention provide a method of grouping and mapping relay stations in a wireless multi-hop network, such as the network shown in FIG. 4. FIG. 4 is an illustrative example of an inter-cell topology involving two relay stations operating in a network. The network cell includes a base station (BS) 15, a first relay station (RS1) 55, a second relay station (RS2) 65, a first mobile station (MS1) 25, a second mobile station (MS2) 35, and a third mobile station (MS3) 45. In this example, an algorithm of the present invention could be executed and the results stored in the base station 15, such that transmission links 37, 47, and 57 could be mapped. However, the present invention is not limited to any particular location at which an algorithm is executed or results are stored.

FIG. 4 is only an illustrative example of an inter-cell topology involving two relay stations operating in an OFDMA network. The various embodiments of the present invention are not limited to an OFDMA network including only a single base station, two relays stations, and three mobile stations as illustrated in FIG. 4, but may include any wireless communication network supporting any number of base stations, relay stations, and mobile stations.

The present invention relates to a method of grouping and mapping relay stations in a wireless multi-hop network in OFDMA networks, and in particular, those based on the Institute of Electrical and Electronics Engineers (IEEE) 802.16 standard. However, the present invention is not limited to relay stations or to any specific types of networks or to any specific standards, and the various methods of the present invention could be applied in various different types of applications. Furthermore, the present invention is not limited to wireless multi-hop networks, but may also include single hop networks.

The present invention relates to the IEEE 802.16 standard, which includes its amendments and extensions, such as, for example, IEEE 802.16e, IEEE 802.16j, and IEEE 802.16m. The IEEE 802.16 standard, and each of its extensions, are incorporated herein by reference in their entirety.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of mapping transmission stations in a wireless network, comprising:
   grouping, using a computer, the transmission stations such that at least two transmission stations in at least one group transmit a sounding signal in a same time symbol,
   wherein the grouping further comprises
      sorting the transmission stations in descending order according to a number of transmission links of each transmission station that are unmapped;
      beginning with a transmission station with a largest number of unmapped transmission links, evaluating each transmission station based on how many unmapped transmission links can be mapped if the evaluated transmission station is made to transmit a sounding signal;
      placing each transmission station into a group, based on the evaluation, until all of the transmission links are mapped or until a maximum number of sounding bands available for transmission of sounding signals in the same time symbol are used; and
      if all of the transmission links are not mapped, repeating the sorting, evaluating, and placing for each time symbol until all of the transmission links are mapped.

2. The method according to claim 1, wherein the method is executed by an algorithm.

3. The method according to claim 2, wherein the algorithm receives as inputs a total number of transmission stations to be mapped and a number of sounding bands available for transmission of sounding signals in a single time symbol.

4. The method according to claim 3, wherein a number of time symbols required to map a total number of transmission stations N is the value of log 2(N) rounded to the nearest integer greater than or equal to log 2(N).

5. The method according to claim 2, wherein the algorithm is implemented in a base station in the multi-hop network.

6. The method according to claim 1, wherein the method is executed by an algorithm.

7. The method according to claim 6, wherein the algorithm receives as inputs a total number of transmission stations to be mapped and a number of sounding bands available for transmission of sounding signals in a single time symbol.

8. The method according to claim 7, wherein a number of time symbols required to map a total number of transmission stations N is the value of log 2(N) rounded to the nearest integer greater than or equal to log 2(N).

9. The method according to claim 1, wherein the algorithm is implemented in a base station in the multi-hop network.

10. The method according to claim 1, wherein the network is a network under the Institute of Electrical and Electronics Engineers (IEEE) 802.16 standard.

11. A method of mapping transmission stations in a wireless network, comprising:

inputting, into an algorithm executed by a computer, a number of transmission stations to be mapped;

inputting, into the algorithm, a maximum number of sounding bands available in a single sounding slot for sounding signals to be sent by the transmission stations;

calculating a total number of sounding slots required to map all links between the transmission stations; and grouping the transmission stations by sounding slot, wherein at least two transmission stations in at least one group transmit a sounding signal in a same sounding slot.

12. The method according to claim 11, wherein the grouping further comprises:

sorting the transmission stations in descending order according to a number of links of each transmission station that are unmapped;

beginning with a transmission station with a largest number of unmapped links, evaluating each transmission station based on how many unmapped links can be mapped if the evaluated transmission station is made to transmit a sounding signal;

placing each transmission station into a group, based on the evaluation, until all of the transmission links are mapped or until a maximum number of sounding bands available for transmission of sounding signals in the same sounding slot are used; and if all of the transmission links are not mapped, repeating the sorting, evaluating, and placing for each sounding slot until all of the transmission links are mapped.

13. The method according to claim 12, wherein a number of sounding slots required to map a total number of transmission stations N is the value of log 2(N) rounded to the nearest integer greater than or equal to log 2(N).

14. The method according to claim 13, wherein each sounding slot has a length of a single time symbol.

15. The method according to claim 13, wherein the method is executed by an algorithm.

16. A method of grouping transmission stations in a wireless network, comprising:

sorting, using a computer, the transmission stations in descending order according to a number of transmission links of each transmission station that are unmapped;

beginning with a transmission station with a largest number of unmapped transmission links, evaluating each transmission station based on how many unmapped transmission links can be mapped if the evaluated transmission station is made to transmit a sounding signal;

placing each transmission station into a group, based on the evaluation, until all transmission links are mapped or until a maximum number of sounding bands available for transmission of sounding signals in the same time symbol are used, wherein at least two transmission stations in at least one group transmit a sounding signal in the same time symbol; and if all of the transmission links are not mapped, repeating the sorting, evaluating, and placing for each time symbol until all of the transmission links are mapped.

17. The method according to claim 16, wherein a number of time symbols required to map a total number of transmission stations N is the value of log 2(N) rounded to the nearest integer greater than or equal to log 2(N).

18. The method according to claim 17, wherein the method is executed by an algorithm.

19. The method according to claim 16, wherein the network is a network under the Institute of Electrical and Electronics Engineers (IEEE) 802.16 standard.

* * * * *